(12) United States Patent
Kim (10) Patent No.: US 10,571,990 B2
(45) Date of Patent: Feb. 25, 2020

(54) METHOD FOR OPTIMIZING THE SLEEP MODE OF TELEMATICS MULTIMEDIA UNIT DATA MODEM

(71) Applicant: Hyundai Motor Company, Seoul (KR)

(72) Inventor: Jang Yeol Kim, Gyeonggi-doi (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 278 days.

(21) Appl. No.: 15/835,975

(22) Filed: Dec. 8, 2017

(65) Prior Publication Data

US 2018/0335825 A1 Nov. 22, 2018

(30) Foreign Application Priority Data

May 16, 2017 (KR) .................. 10-2017-0060402

(51) Int. Cl.
  *G06F 1/32* (2019.01)
  *H04L 29/08* (2006.01)
  (Continued)

(52) U.S. Cl.
  CPC .......... *G06F 1/3212* (2013.01); *G06F 1/3206* (2013.01); *G06F 1/3278* (2013.01); *G06F 1/3287* (2013.01); *H04L 67/125* (2013.01); *H04W 4/14* (2013.01); *H04W 52/0235* (2013.01); *G06F 1/26* (2013.01)

(58) Field of Classification Search
  CPC ......... G06F 1/32; H04W 52/02; H04L 67/125
  See application file for complete search history.

(56) References Cited

U.S. PATENT DOCUMENTS

2002/0106997 A1* 8/2002 Barber .............. H04W 52/0229
                                                    455/343.1
2005/0143146 A1* 6/2005 Kim .................. H04W 52/0216
                                                    455/574
(Continued)

FOREIGN PATENT DOCUMENTS

| JP | 2010-160085 A | 7/2010 |
| KR | 10-0839980 B1 | 6/2008 |
| KR | 10-1491366 B1 | 2/2015 |
| KR | 2015-0029237 A | 3/2015 |

(Continued)

*Primary Examiner* — Phil K Nguyen
(74) *Attorney, Agent, or Firm* — Mintz Levin Cohn Ferris Glovsky and Popeo, P.C.; Peter F. Corless (57) ABSTRACT

A method is for managing power consumption in a remotely controllable vehicle includes: operating a telematics multimedia unit (TMU) data modem of the vehicle in a remote standby mode; setting a communication mode corresponding to a communication mode most recently used by the TMU data modem; setting a timer on a remote standby mode for a predetermined time; deducting an amount of residual current in a battery of the vehicle by an operating current having a predetermined level according to a power usage condition in a predetermined period, wherein the power usage condition is determined based on a location of the TMU data modem; monitoring whether the amount of residual current is lower than a threshold level after the predetermined time of the timer elapses; and terminating the remote standby mode when the amount of residual current is lower than the threshold level after the predetermined time of the timer elapses.

19 Claims, 4 Drawing Sheets

(51) Int. Cl.
  *H04W 52/02* (2009.01)
  *H04W 4/14* (2009.01)
  *G06F 1/3212* (2019.01)
  *G06F 1/3206* (2019.01)
  *G06F 1/3234* (2019.01)
  *G06F 1/3287* (2019.01)
  *G06F 1/26* (2006.01)

(56) References Cited

U.S. PATENT DOCUMENTS

| | | | |
|---|---|---|---|
| 2011/0032794 A1* | 2/2011 | Rhodes | G01V 1/22 367/15 |
| 2011/0086638 A1* | 4/2011 | Medapalli | H04W 36/0016 455/436 |
| 2011/0309840 A1 | 12/2011 | Yamaguchi | |
| 2013/0191663 A1* | 7/2013 | Overcash | G06F 1/3209 713/320 |
| 2013/0212418 A1* | 8/2013 | Ueda | G06F 1/3287 713/323 |
| 2013/0266024 A1* | 10/2013 | Schoppmeier | H04L 12/12 370/465 |
| 2013/0334320 A1* | 12/2013 | Thill | G06K 19/07 235/492 |
| 2016/0360486 A1* | 12/2016 | Okawa | H04W 52/0241 |
| 2018/0043827 A1* | 2/2018 | Moon | H04L 25/38 |

FOREIGN PATENT DOCUMENTS

| | | |
|---|---|---|
| KR | 10-1514442 B1 | 4/2015 |
| KR | 10-1535627 B1 | 7/2015 |
| WO | 2012138010 A1 | 10/2012 |

\* cited by examiner

METHOD FOR OPTIMIZING THE SLEEP MODE OF TELEMATICS MULTIMEDIA UNIT DATA MODEM

CROSS-REFERENCE TO RELATED APPLICATION

This application claims the benefit of priority to Korean Patent Application No. 10-2017-0060402, filed on May 16, 2017 in the Korean Intellectual Property Office, the disclosure of which is hereby incorporated by reference as if fully set forth herein.

TECHNICAL FIELD

The disclosure relates generally to a telematics multimedia unit data modem, and more particularly, to a vehicle equipped with a telematics multimedia unit (TMU) configured to perform a remote control function via a wireless network supported by the vehicle.

BACKGROUND

Recently, vehicles are equipped with devices that provide information of various types to a plurality of subscribers in real-time via a wired or wireless communication network. For example, a remote control system can remotely communicate with devices equipped in the vehicle such as a telematics terminal. As telematics services have increased, reliability of additional functions, such as remote control systems, has a great influence on the degree of customer satisfaction.

The remote control system can be provided by a server located remote of the vehicle as well as a telematics unit or a portable terminal (e.g., a remote control terminal or a smart phone), which is engaged with the vehicle. The server can be coupled with the telematics unit or the portable terminal via wireless communication. The remote control system, requested by the driver through mutual wireless communication between the vehicle and the portable terminal, can provide useful information of the vehicle, such as a diagnostic status, vehicle ignition lock, vehicle speed deceleration, remote air conditioning control, remote door lock control, theft detection, and so on.

In addition, the remote control system can remotely control the vehicle based on a short message service (SMS) in response to a driver's request after the driver completes an authentication process by, for example, calling a telematics center operating the server. For example, when a user uses a mobile device to request a remote control service to a server in a telematics center, the server in the telematics center communicates with a telematics unit in the vehicle for delivering a corresponding service command. When the telematics center receives a response from the telematics unit, the server in the telematics center then delivers a message such as a SMS message corresponding to the response (e.g., "successfully completed") to the mobile device to achieve or complete the remote control service.

Even after the telematics unit enters a sleep mode, the telematics unit can receive a text message or a voice call through discontinuous reception (DRX) for paging from a mobile communication center such as a Core Network (CN) or UMTS Terrestrial Radio Access Network (UTRAN) which communicates with the server.

The telematics terminal needs a booting time to be available to the user if power is supplied after an ignition is turned on. However, a user or driver is inconvenienced when the booting time increases. In the worst case, the user or driver could not use the telematics terminal at the desired time. Considering these characteristics, the telematics terminal may be operated through power stored in an in-vehicle battery.

Further, in a sleep mode, a communication modem is configured to perform wireless communication with a base station to support the requested remote service, such as remote start, even while the ignition is turned off. However, in order to prevent discharge of the battery because the communication modem uses power stored in the battery in the sleep mode, the vehicle could turn off the communication modem completely for a predetermined standby time after the ignition is turned off.

In a state where the power of the communication modem is completely blocked and the user is unable to connect to the vehicle or use a telematics service performed through the mobile phone or the call center. In this case, if a service is not properly provided, the user may not understand the reason of service error (e.g., a service failure error from the call center or a discharge of the in-vehicle battery).

Meanwhile, power saving algorithms are needed due to the recent increase of broadband LTE data modems in vehicles, as well as the complexity of power consumption caused by communication using different communication protocols a mixed communication networks of 2G/3G/4G. Conventionally, dark current consumption in the communication modem may be calculated while the ignition is turned off based on a single communication mode. Thus, when the communication modes such as 2G/3G/4G can be used selectively and interchanged with each other, it may not be possible to accurately determine whether a dark current supplied to the devices operating using the power of the battery exceeds a predetermined level.

Accordingly, the TMU network is relatively considering packet transmission/reception between a base station and a TMU terminal of a vehicle, rather than an algorithm filled with a simple calculation formula. Further, in response to a communication mode at a handover region ("handover" is a solution for changing a cell when a mobile terminal moves from a based station area to another base station area), an accurate current consumption calculation is required to accurately calculate current consumption based on a shadow communication region (areas where radio waves from the base station cannot be received or mixed with shaded areas), a superposition area of strong and weak electric fields (the intensity of the received electric field at the time of the remote service is the region where the strong electric field and the weak electric field are overlapped), and international roaming

SUMMARY

The present disclosure provides a method for optimizing a standby mode at a data modem of a telematics multimedia unit, which includes a process of accurately determining whether a dark current 2G/3G/4G compatible communication methods exceeds a predetermined level, as opposed to a conventional process that calculates current consumption based on a single communication method.

The present disclosure further provides a method performed within a shadow communication region and a global roaming mode to provide a standby mode optimization method for the data modem of the telematics multimedia unit, which can maximize a time available for remotely controlling a vehicle.

The present disclosure further provides a standby mode optimization method, which can transmit to user's mobile terminal a message for checking whether a remote start is performed when it is recognized by a current subtraction method that a dark current exceeds a predetermined level, so that a vehicle may start in response to a user's instruction to charge the battery, allowing a standby mode to be maintained for longer.

The present disclosure further provides a method for optimizing a standby mode of the data modem of the telematics multimedia unit, which can extend a standby mode time longer than four days, even after the vehicle ignition is turned off.

According to embodiments of the present disclosure, a method for managing power consumption in a remotely controllable vehicle includes: operating a telematics multimedia unit (TMU) data modem of the vehicle in a remote standby mode; setting a communication mode corresponding to a communication mode most recently used by the TMU data modem; setting a timer on a remote standby mode for a predetermined time; deducting an amount of residual current in a battery of the vehicle by an operating current having a predetermined level according to a power usage condition in a predetermined period, wherein the power usage condition is determined based on a location of the TMU data modem; monitoring whether the amount of residual current is lower than a threshold level after the predetermined time of the timer elapses; and terminating the remote standby mode when the amount of residual current is lower than the threshold level after the predetermined time of the timer elapses.

The predetermined period can be determined based on an error in a loading time and a current reduction time during the remote standby mode.

The location of the TMU data modem can be one of a handover region, a shadow communication region, a superposition region of strong and weak electric fields, and an international roaming region.

The deducting the amount of residual current, when the TMU data modem locates in the shadow communication region, can include determining whether a communication service is currently available in the shadow communication region; and determining whether the communication service has previously been available in the shadow communication region.

The deducting the amount of residual current can further include, when the communication service is currently available in the shadow communication region and has previously been available in the shadow communication region, deducting the amount of residual current in the battery by an amount of current used for a number of receptions of emergency short message service (SMS) messages and a number of callings to a telematics center performed by the TMU data modem.

The deducting the amount of residual current can further include, when the communication service is currently available in the shadow communication region but has not previously been available in the shadow communication region, deducting the amount of residual current in the battery by a predetermined amount for registration in the predetermined period and an amount of current used for the number of receptions of emergency SMS messages and the number of callings to the telematics center performed by the TMU data modem.

The deducting the amount of residual current can further include, when the communication service is not available currently in the shadow communication region but has previously been available in the shadow communication region, deducting the amount of residual current in the battery by a predetermined amount for search in the predetermined period and an amount of current used for the number of receptions of emergency SMS messages and the number of callings to the telematics center performed by the TMU data modem.

The deducting the amount of residual current can further include, when the communication service is not available currently in the shadow communication region and has not previously been available in the shadow communication region, deducting the amount of residual current in the battery by a predetermined amount in each period that a procedure is performed when the communication service is not available in the shadow communication region.

When the TMU data modem is located in the superposition region of strong and weak electric fields, the deducting the amount of residual current can include determining an occurrence of a telematics center call rejection, an occurrence of an emergency SMS message reception, or an occurrence of an emergency SMS message rejection in the superposition region of strong and weak electric fields; and deducting the amount of residual current in the battery by a predetermined amount for search in the predetermined period when there is no failure in any of: the telematics center call, emergency SMS message generation, and the emergency SMS message rejection.

The deducting the amount of residual current, when the TMU data modem is located in the superposition region of strong and weak electric fields, determining an occurrence of a telematics center call rejection, an occurrence of an emergency SMS message reception, or an occurrence of an emergency SMS message rejection in the superposition region of strong and weak electric fields; and determining a receiving electric field level in the superposition region.

The deducting the amount of residual current can further include, when the telematics center call is rejected, deducting the amount of residual current in the battery by an amount corresponding to a number of predetermined periods of call rejection procedures performed in response to the receiving electric field level.

The deducting the amount of residual current can further include, when the emergency SMS message is received, deducting the amount of residual current in the battery by an amount corresponding to a number of predetermined periods of message reception procedures performed in response to the receiving electric field level.

The deducting the amount of residual current can further include, when the emergency SMS message is rejected, deducting the amount of residual current in the battery by an amount corresponding to a number of predetermined periods of message rejection procedures performed in response to the receiving electric field level.

The deducting the amount of residual current, when the TMU data modem is located in one of the handover region and the international roaming region, can include determining a number of handover occurrences or a number of occurrences of searching a home network for roaming.

The deducting the amount of residual current can further include, when there are no handover occurrences or no occurrence of searching the home network for roaming, deducting the amount of residual current in the battery by a predetermined amount for the communication service in the predetermined period.

The deducting the amount of residual current can further include, when there is at least one handover occurrence, determining a receiving electric field level in the handover region; and deducting the amount of residual current in the battery by an amount corresponding to a number of predetermined periods in which a handover procedure is performed in response to the receiving electric field level.

The handover occurrence may correspond to an occurrence of tracking area update (TAU) when the communication mode is Long-Term Evolution (LTE).

The handover occurrence may correspond to an occurrence of Routing Area Update (RAU) or Location Area Update (LAU) when the communication mode is Wideband Code Division Multiplexing Access (WCDMA) or Global System for mobile (GSM).

The handover occurrence may correspond to an occurrence of registration when the communication mode is Code-division multiple access (CDMA).

The deducting the amount of residual current can further include, when there is at least one occurrence of searching the home network for roaming, determining a receiving electric field level in the handover region; and deducting the amount of residual current in the battery by an amount corresponding to a number of predetermined periods in which a procedure of searching the home network for roaming is performed.

An apparatus for managing power consumption in a remotely controllable vehicle can include a processing system that comprises at least one data processor and at least one computer-readable memory storing a computer program. Herein, the processing system is configured to cause the apparatus to operate a telematics multimedia unit (TMU) data modem in a remote standby mode; set a communication mode as the last one used by the TMU data modem; set a timer on a remote standby mode for a predetermined time; deduct an amount of residual current in a battery by an operating current which has a predetermined level according to a power usage condition every predetermined period, wherein the power usage condition is determined based on location of the TMU data modem; monitor whether the amount of residual current is lower than a threshold level when the predetermined time of the timer passes; and terminate the remote standby mode when the amount of residual current is lower than the threshold level after the predetermined time of the timer passes.

Advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Reference will now be made in detail to the embodiments of the present disclosure, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

In the description of embodiments the present disclosure, certain detailed explanations of related art are omitted when it is deemed that they may unnecessarily obscure the essence of the disclosure. The features of the disclosure will be more clearly understood from the accompanying drawings and should not be limited by the accompanying drawings. It is to be appreciated that all changes, equivalents, and substitutes that do not depart from the spirit and technical scope of the disclosure are encompassed in the disclosure.

Hereinafter, a method of optimizing a sleep mode at a data modem of a telematics multimedia unit according to embodiments of the disclosure will be described in detail with reference to FIGS. 1 to 4.

Figure 1:
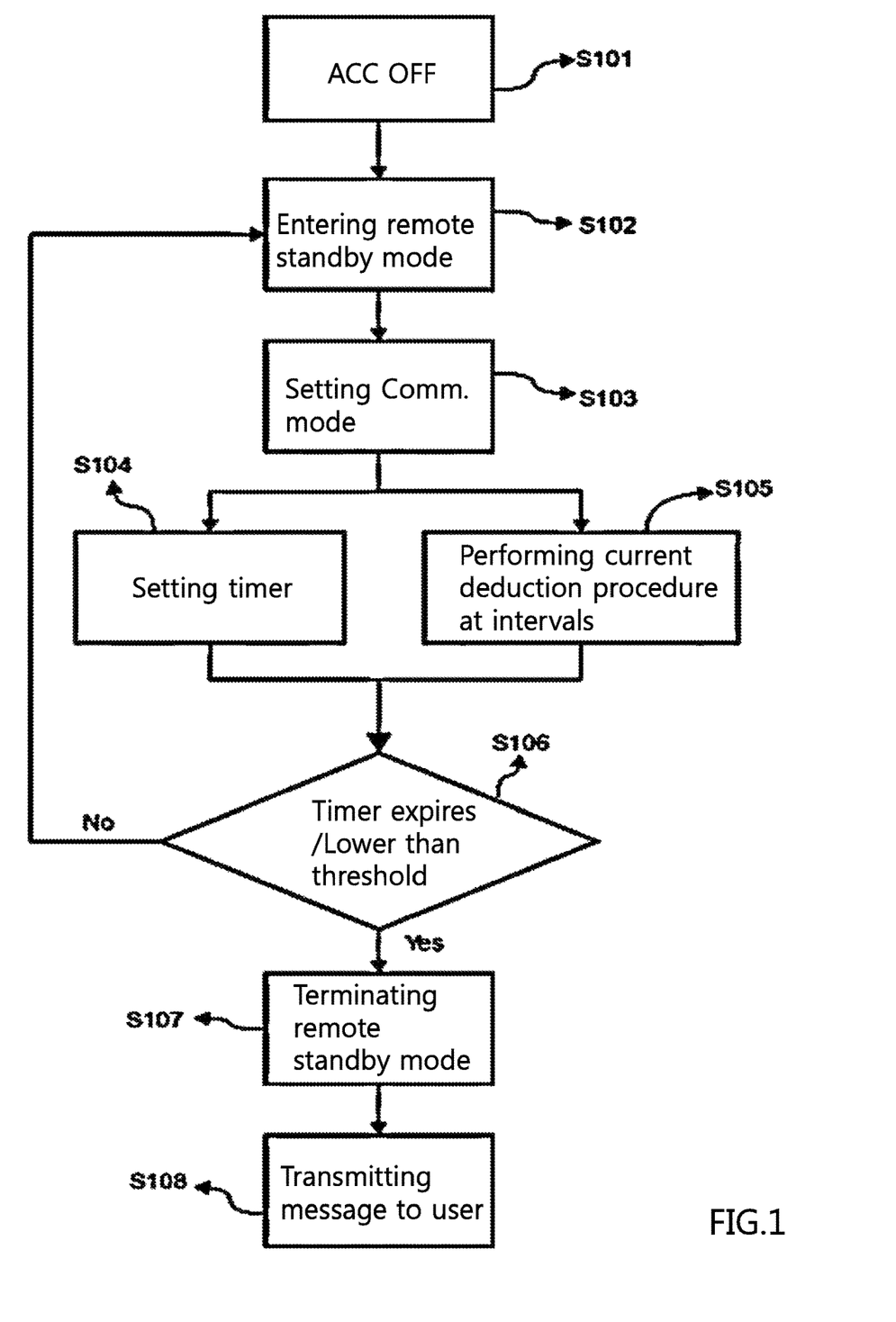
FIG. 1 is a flowchart showing a method for optimizing a standby mode at a data modem of a telematics multimedia unit according to embodiments of the present disclosure.

FIG. 1 is a basic flowchart showing a method for optimizing a remote standby mode at the data modem of the telematics multimedia unit according to embodiments of the present disclosure. The remote standby mode of the data modem can be terminated, when a standby time set in a timer passes or when a residual current of a battery becomes lower than a threshold level through a current reduction process described below.

In embodiments of the present disclosure, the data modem can perform a current reduction procedure optimized for a complex/mixed communication network environment used by the telematics multimedia unit (hereinafter referred to as "TMU"), which may be divided into sub-processes according to detailed situations, to control power management of the TMU.

In embodiments of the present disclosure, it is checked first whether an ignition of the vehicle is turned off (step S101).

When the vehicle is turned off, an Audio-Video-Navigator (AVN) which serves as a telematics multimedia unit of the vehicle enters the remote standby mode (step S102). The AVN may recognize a current communication mode, and sets recognized communication mode as a communication mode during the remote standby mode (step S103). That is, though the AVN can support multi-communication modes, the AVN can set a single communication mode (i.e., the recognized communication mode) as the communication mode during the remote standby mode.

On the other hand, in the remote standby mode, the AVN can set a remote standby timer for a predetermined time as a standby time and start the remote standby timer (step S104). Then, the current reduction procedure for deducting an operating current of the data modem in response to each event can be regularly executed at intervals (step S105).

In order to perform the current reduction procedure, a controller can convert an allowable current per each hour [mAH] of an in-vehicle battery into a converted value per each minute [mAM] to calculate an operating current [B] of the data modem.

In step S106, the controller can determine whether the standby time set at the remote standby timer (step S104) is over. Or, the controller can determine whether the residual current is lower than a threshold level, the maximum or minimum level responsive to each situation, after the current reduction procedure is performed (step S105). That is, when at least one of the two above described conditions is satisfied, the remote standby mode can be terminated.

Preferably, a period or an interval of performing a procedure for deducting an available current (e.g., residual current) can be determined based at least on a time required for loading a system during the remote standby mode and a timing error or gap for current reduction. By the way of example but not limitation, the period or the interval can be 1 minute.

Alternatively, while a communication service is not provided, the current reduction procedure may be executed at 5 minute intervals.

Hereinafter, the current reduction procedure in step S105 will be described. In the disclosure, the current reduction procedure can be divided into sub-processes, each performed for a handover region, a shadow communication region, a superposition region of strong and weak electric fields, and an international roaming region, respectively.

Figure 2:
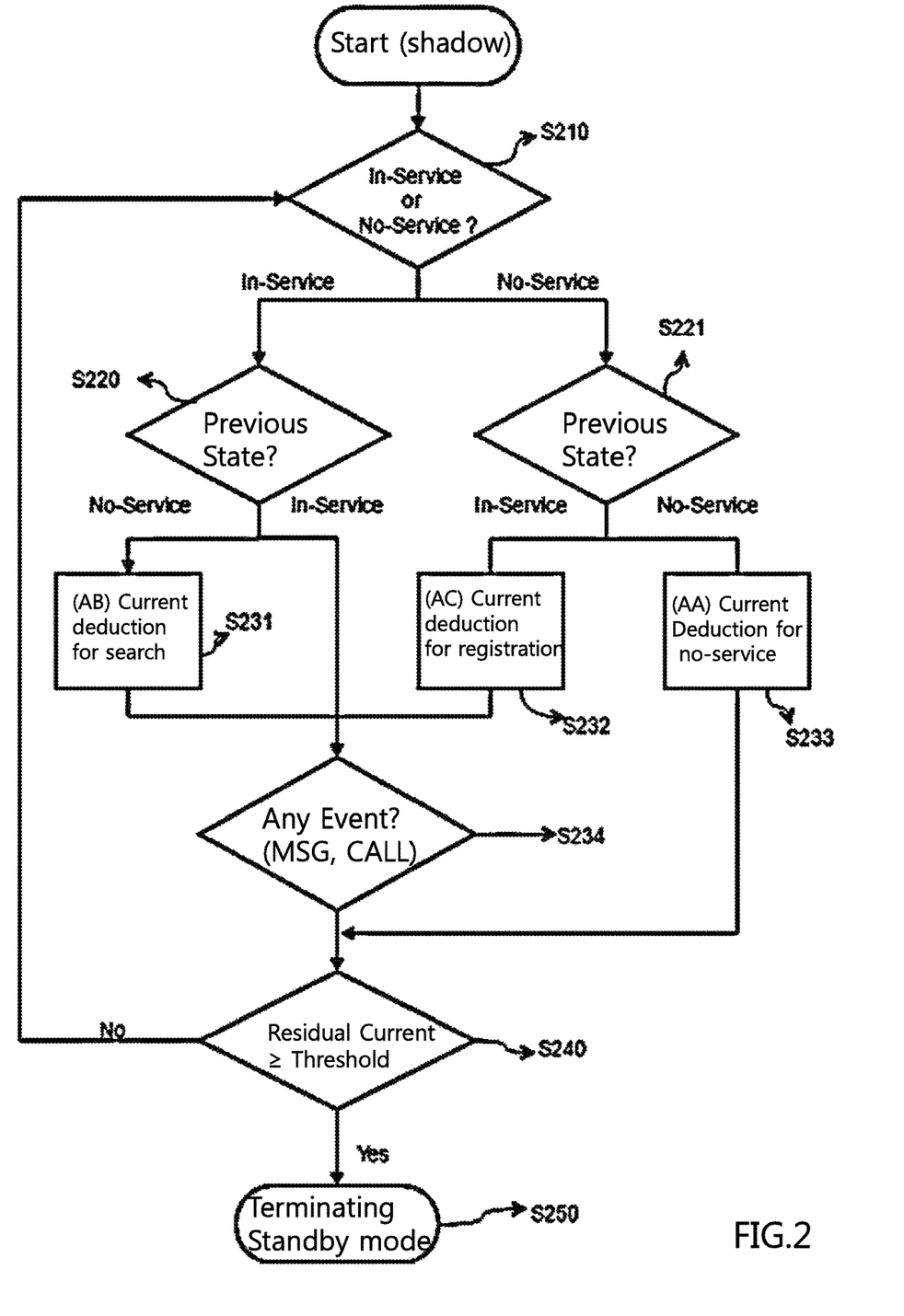
FIG. 2 is a flowchart showing a method for reducing current consumption to optimize a standby mode at a data modem of a telematics multimedia unit, which locates in a shadow communication region, according to embodiments of the present disclosure.

FIG. 2 is a flowchart showing a method for reducing current consumption to optimize a standby mode at a data modem of a telematics multimedia unit, which locates in a shadow communication region, according to embodiments of the present disclosure.

As shown in FIG. 2, the procedure for deducting an available current in the shadow communication region can begin from determining whether the communication service is enabled or disabled (step S210).

Regardless of whether a communication service is available, the current reduction procedure may be performed, and a previous state can be checked (steps S220, S221). For the way of example but not limitation, when entering the service availability condition from the service disabling condition according to the state check, a residual current in the battery may be deducted every predetermined period (e.g., 1 minute) by a current amount required for registration (step S233, AC algorithm).

On the other hand, when the communication service is available, the residual current in the battery may be deducted by a current amount corresponding to the number of emergency SMS message reception and the number of the center call. When the condition is changed into the service disabled condition, the residual current in the battery may be deducted by a current amount for a network search procedure (step S231, AB algorithm).

When the communication service has been disabled, the controller may subtract a current amount corresponding to non-service condition for each predetermined period from the residual current in the battery (step S233, AA algorithm). Then, in step S234, the residual current in the battery may be deducted by an amount of current consumed by a mixed mode of the AB algorithm and the AC algorithm as well as an amount of current corresponding to the number of remote services in a normal operation.

Then, when a marginal current reaches 0 mA, e.g., the residual current reaches the minimum required level due after above described current reduction procedure, the remote standby mode can be terminated (step S240).

Figure 3:
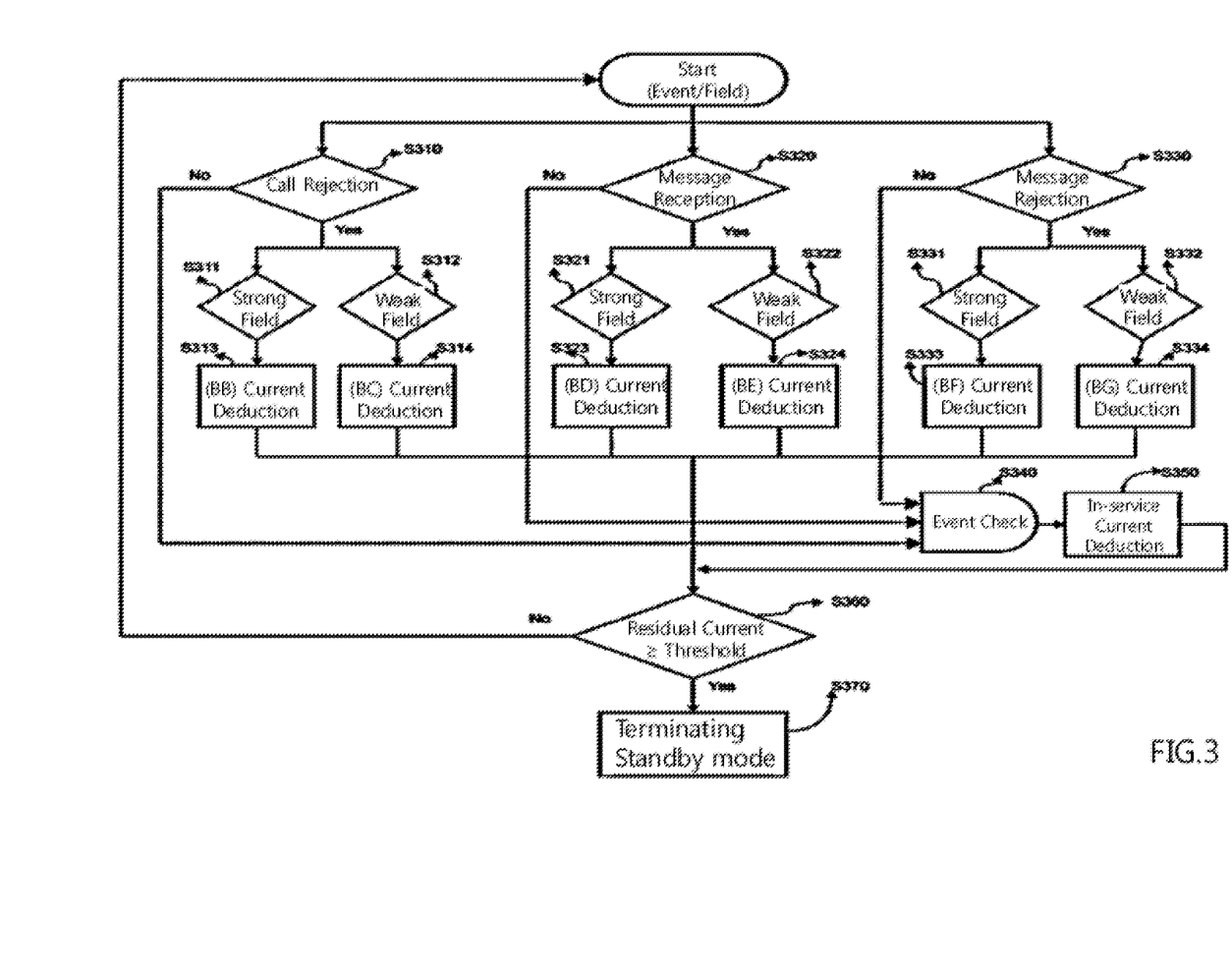
FIG. 3 is a flowchart showing a method for reducing current consumption, based on a communication status and an electric intensity, to optimize a standby mode at a data modem of a telematics multimedia unit according to embodiments of the present disclosure.

FIG. 3 is a flowchart showing a method for reducing current consumption, based on a communication status and an electric intensity, to optimize a standby mode at a data modem of a telematics multimedia unit according to embodiments of the present disclosure.

As shown in FIG. 3, a procedure for subtracting an operating current for each situation from the residual current in the battery where the data modem locates in a superposition region of strong and weak electric fields can check at least one of occurrence of a center call rejection (step S310), occurrence of a remote message reception (step S320) or occurrence of a remote message rejection (step S330). Further, the procedure can include checking whether the field reception field level falls within a strong electric field or a weak field electric field. Herein, a reference/criterion for distinguishing the strong electric field from the weak field electric field may be determined based on standards according to the communication mode (2G/3G/4G/LTE or etc.)

When there is no failure (step S340) after the steps S310, S320, S330 are performed previously, the current consumption per a predetermined time/period in a normal state of the communication service can be subtracted from the residual current (step S350). When there is any failure, the following process may be executed.

When the center call rejection occurs and the field reception field level falls within a strong electric field, the amount of residual current may be deducted by an amount corresponding to the number of predetermined periods of call rejection procedures in the strong electric field (step S313, BB algorithm).

When the center call rejection occurs and the field reception field level falls within a weak electric field, the amount of residual current may be deducted by an amount corresponding to the number of predetermined periods of call rejection procedures in the weak electric field (step S314, BC algorithm).

When the remote message is received and the field reception field level falls within a strong electric field, the amount of residual current may be deducted by an amount corresponding to the number of predetermined periods for message reception procedures performed in the strong electric field (step S323, BD algorithm).

When the remote message is received and the field reception field level falls within a weak electric field, the amount of residual current may be deducted by an amount corresponding to the number of predetermined periods for message reception procedures performed in the weak electric field (step S324, BE algorithm).

When the remote message is rejected and the field reception field level falls within a strong electric field, the amount of residual current may be deducted by an amount corresponding to the number of predetermined periods for message rejection procedures performed in the strong electric field (step S333, BF algorithm).

When the remote message is rejected and the field reception field level falls within a weak electric field, the amount of residual current may be deducted by an amount corresponding to the number of predetermined periods for message rejection procedures performed in the weak electric field (step S334, BG algorithm).

Further, the following steps described in FIG. 3 are substantially similar to those in FIG. 2.

Figure 4:
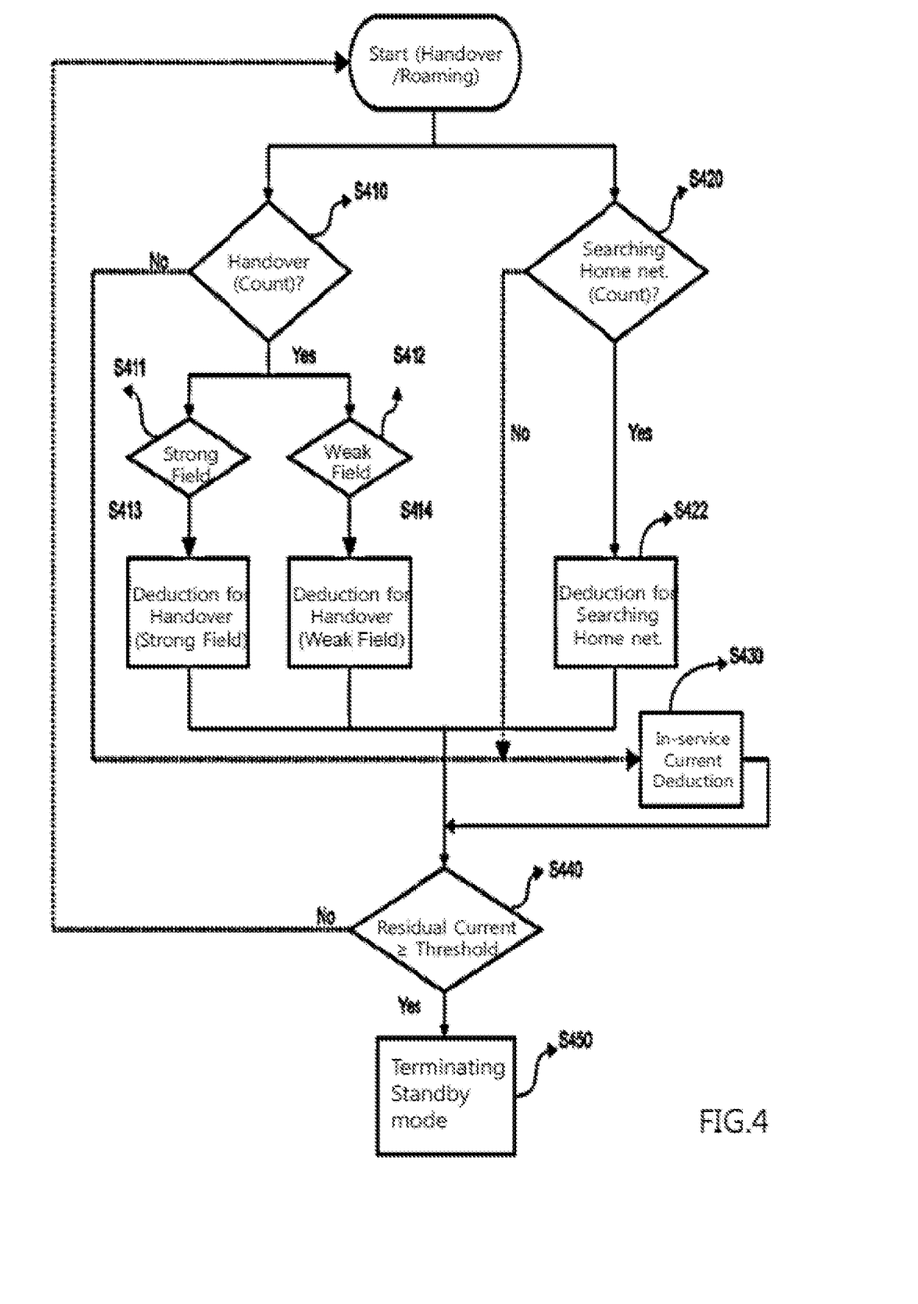
FIG. 4 is a flowchart showing a method for reducing current consumption during a handover procedure or a global roaming mode to optimize a standby mode at a data modem of a telematics multimedia unit according to embodiments of the present disclosure.

FIG. 4 is a flowchart showing a method for reducing current consumption during a handover procedure or a global roaming mode to optimize a standby mode at a data modem of a telematics multimedia unit according to embodiments of the present disclosure.

As shown in FIG. 4, a procedure for deducting current consumption during a handover mode or a global roaming mode can include determining how many times the handover occurs or how many times the data modem searches a home network (steps S410, S420).

When there is no handover or home search in the previous step, the current consumption per a time in the normal state of communication service can be subtracted from the residual current in the battery. When there is any event regarding the handover or the roaming, the following process may be executed.

For example, when the field reception field level at the handover region falls within a strong electric field, the amount of residual current may be deducted by an amount corresponding to the number of predetermined periods for handover procedures performed in the strong electric field (step S413). But, when the field reception field level at the handover region falls within a weak electric field, the amount of residual current may be deducted by an amount corresponding to the number of predetermined periods for handover procedures performed in the weak electric field (step S414).

When there is the occurrence of searching the home network for roaming, the controller may check a receiving electric field level in the handover region, and deduct the amount of residual current by an amount corresponding to the number of predetermined periods for procedures of searching the home network (step S422). The following steps described in FIG. 4 are substantially similar to those in FIG. 2.

On the other hand, in a case of handover, an event considered a reference for deducting the amount of residual current in the battery can include occurrence of Tracking Area Update (TAU) in LTE communication mode, Routing Area Update (RAU) or Location Area Update (LAU) in WCDA/GSM communication mode, or Registration in CDMA communication mode.

According to the embodiments described above regarding the standby mode optimization method at the data modem of the telematics multimedia unit, as compared with a conventional technology in which the single communication mode reference consumption current is calculated, it is likely to accurately determine whether or not the dark current is exceeded over a threshold level in a mixed mode of 2G/3G/4G/etc.

In addition, according to the disclosed embodiments regarding the standby mode optimization method at the data modem of the telematics multimedia unit, the time available for remote control of the vehicle can be extended or maximized through an optimized procedure for a shadow communication region and a global roaming mode.

According to the disclosed embodiments regarding the standby mode optimization method at the data modem of the telematics multimedia unit, when the dark current allowed by the current reduction procedure is exceeded over a threshold level, a message for a remote start may be sent to user's smart phone, so that an ignition could be turned on in response to user's instruction or request to maintain the standby mode of an in-vehicle telematics terminal.

The aforementioned embodiments of the present disclosure are achieved by disclosure in a predetermined manner. Each of the structural elements and features, and combinations thereof, can be considered selectively unless specified separately. Each of the structural elements or features may be carried out without being combined with other structural elements or features. Also, some structural elements and/or features may be combined with one another to constitute the embodiments of the present disclosure. The order of operations described in the disclosed embodiments of the disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof.

It will be apparent to those skilled in the art that various modifications and variations can be made in the present disclosure without departing from the spirit or scope of the disclosure. Thus, it is intended that the disclosure covers the modifications and variations of this disclosure provided they come within the scope of the appended claims and their equivalents.

What is claimed is:

1. A method for managing power consumption in a remotely controllable vehicle, the method comprising:
    operating a telematics multimedia unit (TMU) data modem of the vehicle in a remote standby mode;
    setting a communication mode corresponding to a communication mode most recently used by the TMU data modem;
    setting a timer on the remote standby mode for a predetermined time;
    deducting an amount of residual current in a battery of the vehicle by an operating current having a predetermined level according to a power usage condition in a predetermined period, wherein the power usage condition is determined based on a location of the TMU data modem;
    monitoring whether the amount of residual current is lower than a threshold level after the predetermined time of the timer elapses; and
    terminating the remote standby mode when the amount of residual current is lower than the threshold level after the predetermined time of the timer elapses;
    wherein the predetermined period is determined based on an error in a loading time and a current reduction time during the remote standby mode.

2. The method according to claim 1, wherein the location of the TMU data modem is one of a handover region, a shadow communication region, a superposition region of strong and weak electric fields, and an international roaming region.

3. The method according to claim 2, wherein the deducting of the amount of residual current in the battery comprises:
    when the TMU data modem is located in the shadow communication region,
    determining whether a communication service is currently available in the shadow communication region; and
    determining whether the communication service has previously been available in the shadow communication region.

4. The method according to claim 3, wherein the deducting of the amount of residual current in the battery further comprises:
    when the communication service is currently available in the shadow communication region and has previously been available in the shadow communication region,
    deducting the amount of residual current in the battery by an amount of current used for a number of receptions of emergency short message service (SMS) messages and a number of callings to a telematics center performed by the TMU data modem.

5. The method according to claim 3, wherein the deducting of the amount of residual current in the battery further comprises:
    when the communication service is currently available in the shadow communication region but has not previously been available in the shadow communication region,
    deducting the amount of residual current in the battery by a predetermined amount for registration in the predetermined period and an amount of current used for the number of receptions of emergency SMS messages and the number of callings to the telematics center performed by the TMU data modem.

6. The method according to claim 3, wherein the deducting of the amount of residual current in the battery further comprises:
    when the communication service is not available currently in the shadow communication region but has previously been available in the shadow communication region,
    deducting the amount of residual current in the battery by a predetermined amount for search in the predetermined period and an amount of current used for the number of receptions of emergency SMS messages and the number of callings to the telematics center performed by the TMU data modem.

7. The method according to claim 3, wherein the deducting of the amount of residual current in the battery further comprises:
    when the communication service is not available currently in the shadow communication region and has not previously been available in the shadow communication region,
    deducting the amount of residual current in the battery by a predetermined amount in each period that a procedure is performed when the communication service is not available in the shadow communication region.

8. The method according to claim 2, wherein the deducting of the amount of residual current in the battery comprises:
    when the TMU data modem is located in the superposition region of strong and weak electric fields,
    determining an occurrence of a telematics center call rejection, an occurrence of an emergency SMS message reception, or an occurrence of an emergency SMS message rejection in the superposition region of strong and weak electric fields; and
    deducting the amount of residual current in the battery by a predetermined amount for search in the predetermined period when there is no failure in any of: the telematics center call, emergency SMS message generation, and the emergency SMS message rejection.

9. The method according to claim 2, wherein the deducting of the amount of residual current in the battery comprises:
    when the TMU data modem is located in the superposition region of strong and weak electric fields,
    determining an occurrence of a telematics center call rejection, an occurrence of an emergency SMS message reception, or an occurrence of an emergency SMS message rejection in the superposition region of strong and weak electric fields; and
    determining a receiving electric field level in the superposition region.

10. The method according to claim 9, wherein the deducting of the amount of residual current in the battery further comprises:
    when the telematics center call is rejected,
    deducting the amount of residual current in the battery by an amount corresponding to a number of predetermined periods of call rejection procedures performed in response to the receiving electric field level.

11. The method according to claim 9, wherein the deducting of the amount of residual current in the battery further comprises:
    when the emergency SMS message is received,
    deducting the amount of residual current in the battery by an amount corresponding to a number of predetermined periods of message reception procedures performed in response to the receiving electric field level.

12. The method according to claim 9, wherein the deducting of the amount of residual current in the battery further comprises:
when the emergency SMS message is rejected,
deducting the amount of residual current in the battery by an amount corresponding to a number of predetermined periods of message rejection procedures performed in response to the receiving electric field level.

13. The method according to claim 2, wherein the deducting of the amount of residual current in the battery comprises:
when the TMU data modem is located in one of the handover region and the international roaming region,
determining a number of handover occurrences or a number of occurrences of searching a home network for roaming.

14. The method according to claim 13, wherein the deducting of the amount of residual current in the battery further comprises:
when there are no handover occurrences or no occurrence of searching the home network for roaming,
deducting the amount of residual current in the battery by a predetermined amount for the communication service in the predetermined period.

15. The method according to claim 13, wherein the deducting of the amount of residual current in the battery further comprises:
when there is at least one handover occurrence,
determining a receiving electric field level in the handover region; and
deducting the amount of residual current in the battery by an amount corresponding to a number of predetermined periods in which a handover procedure is performed in response to the receiving electric field level.

16. The method according to claim 15, wherein the handover occurrence corresponds to an occurrence of tracking area update (TAU) when the communication mode is Long-Term Evolution (LTE).

17. The method according to claim 15, wherein the handover occurrence corresponds to an occurrence of Routing Area Update (RAU) or Location Area Update (LAU) when the communication mode is Wideband Code Division Multiplexing Access (WCDMA) or Global System for mobile (GSM).

18. The method according to claim 15, wherein the handover occurrence corresponds to an occurrence of registration when the communication mode is Code-division multiple access (CDMA).

19. The method according to claim 13, wherein the deducting of the amount of residual current in the battery further comprises:
when there is at least one occurrence of searching the home network for roaming,
determining a receiving electric field level in the handover region; and
deducting the amount of residual current in the battery by an amount corresponding to a number of predetermined periods in which a procedure of searching the home network for roaming is performed.

* * * * *